(12) United States Patent
Ouchi et al.

(10) Patent No.: US 8,284,351 B2
(45) Date of Patent: Oct. 9, 2012

(54) BACKLIGHT UNIT AND A LIQUID CRYSTAL DISPLAY APPARATUS APPLYING THE SAME THEREIN

(75) Inventors: Satoshi Ouchi, Kamakura (JP); Koichi Sakita, Chigasaki (JP); Hajime Inoue, Yokohama (JP); Yoshiharu Yamashita, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/353,520

(22) Filed: Jan. 19, 2012

(65) Prior Publication Data

US 2012/0113359 A1    May 10, 2012

Related U.S. Application Data

(63) Continuation of application No. 12/684,877, filed on Jan. 8, 2010, now Pat. No. 8,115,890.

(30) Foreign Application Priority Data

Jan. 22, 2009 (JP) .................................. 2009-011520

(51) Int. Cl.
*G02F 1/1335* (2006.01)
(52) U.S. Cl. ................ 349/69; 349/61; 349/62; 349/63; 349/66; 349/67

(58) Field of Classification Search .................... 349/61, 349/62, 53, 66, 67, 69
See application file for complete search history.

(56) References Cited

U.S. PATENT DOCUMENTS

| 6,241,358 | B1 | 6/2001 | Higuchi et al. |
| 7,940,350 | B2 | 5/2011 | Jeong |
| 2007/0058393 | A1 | 3/2007 | Kim et al. |
| 2007/0247871 | A1 | 10/2007 | Yoo |
| 2008/0231774 | A1 | 9/2008 | Tomita et al. |
| 2009/0185109 | A1 | 7/2009 | Yoon et al. |

FOREIGN PATENT DOCUMENTS

| JP | 2008-103162 | 5/2008 |
| JP | 2008-103200 | 5/2008 |

*Primary Examiner* — Phu Vu
(74) *Attorney, Agent, or Firm* — Kilpatrick Townsend & Stockton LLP

(57) ABSTRACT

A backlight unit and a video display apparatus having a plural number of sets of one or more of light sources. A light guidance plate for guiding lights from the light sources to a side of a liquid crystal panel, to be emitted. The light sources are disposed on one end side of the light guidance plate. Assuming that width of the gap or groove is "d", distance between a light incident surface of the liquid crystal panel and a light emission surface of the light guidance plate, or distance between a light incident surface of an optical member disposed between the liquid crystal panel and the light guidance plate and a light emission surface of the light guidance plate is "h", and further 2.0 mm>d≧0.1 mm and 10.0 mm>h≧0.4 mm, then the following condition is satisfied: 4≦h/d≦100.

4 Claims, 4 Drawing Sheets

BACKLIGHT UNIT AND A LIQUID CRYSTAL DISPLAY APPARATUS APPLYING THE SAME THEREIN

CROSS-REFERENCE TO RELATED APPLICATIONS

This application is a continuation of U.S. patent application Ser. No. 12/684,877, filed on Jan. 8, 2010, which claims priority from Japanese Patent Application 2009-011520, filed on Jan. 22, 2009, the content of which is hereby incorporated by reference into this application.

BACKGROUND OF THE INVENTION

The present invention relates to a backlight unit to be applied in a liquid crystal display apparatus having a liquid crystal panel, and it relates to, in particular, a backlight unit of thin-type, having high luminance and being high in uniformity of luminance thereof, and also being suitable to be applied therein a technology for controlling an intensity of lights upon a liquid crystal panel for each of a plural number of regions, individually (hereinafter, such technology will be called, "an area or local dimming"), and a video display apparatus applying the same therein.

In recent years, as a backlight unit for the liquid crystal display apparatus is applied one of a side light method, sometimes, disposing light source (s) on one end of a liquid crystal panel or both ends thereof to irradiate lights upon the liquid crystal panel. The side light method is advantageous for thin-sizing of the apparatus, but since the light sources are disposed concentrating on the end (s) of the apparatus, heats generated from the light source (s) are also concentrated on the end of the apparatus, and therefore it is difficult to radiate the heats. And, application of the area or local dimming is also difficult, and large-sizing of the apparatus is also difficult. As the conventional art of such side light method is already known what is disclosed in the following Patent Document 1, for example.

On the other hand, so-called a just-under method, building up the backlight by aligning a large number of lines of the light sources on a rear surface of the liquid crystal, is disadvantageous for thin-sizing, since it is necessary to enlarge the distance between the liquid crystal panel and the light source, up to a certain degree so that the lights irradiate upon an entire surface of the liquid crystal panel equally. Also, if trying to build the apparatus of the just-under method to be thin, it is necessary to increase a number of the light sources, and this rises up the const and the power consumption thereof. As the conventional art of such just-under method is already known what is disclosed in the following Patent Document 2, for example.

[Patent Document 1] Japanese Patent Laying-Open No. 2008-103162 (2008); and

[Patent Document 2] Japanese Patent Laying-Open No. 2008-103200 (2008).

BRIEF SUMMARY OF THE INVENTION

An object of the present invention is to provide a backlight unit, being advantageous for thin-sizing of an apparatus, as well as, having high luminance and being high in uniformity of luminance thereof, and further being suitable for applying the area or local dimming therein, and a liquid crystal display apparatus applying the same therein.

According to the present invention, firstly, there is provided a backlight unit, comprising: a plural number of sets of at least one or more of light source (s) and a light guidance plate for guiding lights from said light source (s) to a side of a liquid crystal panel, to be emitted therefrom, wherein said light source (s) is/are disposed on one end side of said light guidance plate, and other set of light source is disposed on a rear surface side of the other end of said light guidance plate opposite to said one end, and a gap or groove is formed mutually between each of the light guidance plates in said plural number of sets, and if assuming that width of said gap or groove is "d", distance between a light incident surface of said liquid crystal panel and a light emission surface of said light guidance plate, or distance between a light incident surface of an optical member disposed between said liquid crystal panel and said light guidance plate and a light emission surface of said light guidance plate is "h", and further 2.0 mm>d≧0.1 mm and 10.0 mm>h≧0.4 mm, then the following condition is satisfied:

$4 \leq h/d \leq 100$.

Also, according to the present invention, secondly, if assuming that the distance of the light emission surface of said light guidance plate is "L", then the following is satisfied:

$L \times h/d \leq 100$.

Also, according to the present invention, thirdly, said light guidance plate includes an incident portion provided on said one end side, upon which the lights from said light sources are incident, a diffuser portion for diffusing the lights incident upon said incident portion, a light emission surface, from which the lights incident upon said incident portion emit, and a diffusing light guidance portion, which is provided between said incident portion and said light emission surface, and if assuming that distance of said diffusing light guidance portion in a light propagating direction is "b", width of said incident portion of said light guidance plate is "W", a number of unit of the light sources corresponding to each of said light guidance plates is "N", and a pitch of the light sources aligned in said incident portion is "P", then the following condition is satisfied:

$W = P \times N$ $P/2\sqrt{3} \leq b \leq P/2 \times \sqrt{3}$.

The light guide plates mentioned above may be connected with as a unit, in each of the plural number of sets.

According to the present invention, it is possible to provide the backlight unit, being advantageous for thin-sizing of an apparatus, as well as, having high luminance and being high in uniformity of luminance thereof, and further being suitable for applying the area or local dimming therein, and the liquid crystal display apparatus applying the same therein.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings.

<Embodiment 1>

Explanation will be made on a first embodiment of the present invention, by referring to FIG. 1 attached. This FIG. 1 is a cross-section view of a backlight unit in the horizontal direction, according to the present invention.

Figure 1:
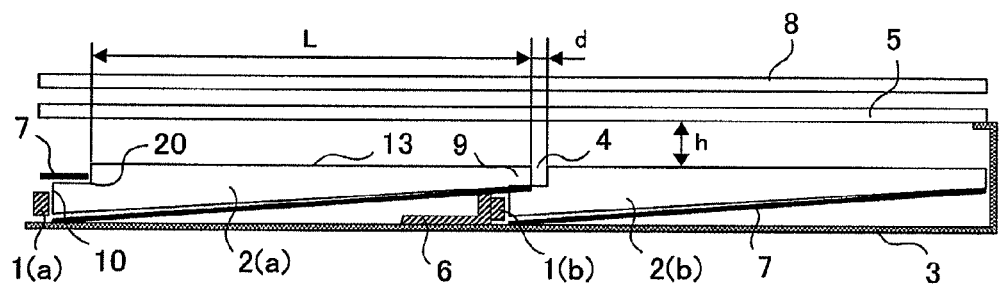
FIG. 1 is a cross-section view of a backlight unit, according to an embodiment 1 of the present invention.

In FIG. 1, a plural number of light sources 1, each being constructed with a light emitting element, such as, a light emitting diode (LED), for example, are aligned in a plural number of lines, along a side end of a light guidance plate 2. The light guidance plate 2 is rectangular or oblong in the configuration seen from the side of a liquid crystal panel 8 (i.e., from above the drawing surface), and according to the present embodiment, a plural number of light sources 1 are aligned along one (1) short side thereof. In the present embodiment, a plural number of groups of the light sources and one (1) light guidance plate 2 are combined as a set (hereinafter, this set may be sometimes called "a light source block", for the purpose of convenience), and this set is fixed or mounted on a chassis 3 made of a metal, such as, aluminum, for example, to be aligned in a parallel direction of the liquid crystal panel 8. In the embodiment mentioned above, although on one (1) short side if the light guidance plate 2 are disposed the plural number of light sources 1, but the light sources 1 may be aligned on one (1) long side of the light guidance plate 2.

Lights irradiated from the light sources 1 are incident upon incident portions, each being provided on the one short side of the light guidance plate 2, and propagate to an edge or tip portion 9, i.e., the short side facing to that incident portion 10. As is shown in the figure, the light guidance plate 2, according to the present embodiment, has a configuration of thinning the cross-section thereof, gradually or step-wisely, from that incident portion over the top portion thereof, and on the side of a reserve surface thereof (i.e., the surface opposite to a light emission surface 13 facing to the liquid crystal panel 8), there is provided a reflector member 7, which is made up with a white colored reflection sheet, for example, and thereby the lights penetrating through a bottom surface of the light guidance plate are reflected upon this reflector member. With such structures, the lights incident upon the incident portion 10 are guided onto the light emission surface 13 while being reflected each surface of the light guidance plate 2 and/or the reflector member 7, and are emitted from the light emission surface 13 to the side of the liquid crystal panel 8.

Further, in the present embodiment, assuming that the aligning direction of the light sources (i.e., a longitudinal direction of the incident portion 10 of the light guidance plate 2) is equal to the perpendicular direction to the liquid crystal panel 8, and that the propagating direction of the lights from the light source 1 (i.e., a direction directing from the incident portion 10 to the tip portion 9) is equal to the parallel direction to the liquid crystal panel 8, then the set mentioned above are aligned in the parallel direction and the perpendicular direction (i.e., a two-dimensional manner). However, it is also possible to change the aligning direction of the light sources 1 into the parallel direction while changing the propagating direction of the lights from the light sources 1 into the perpendicular direction, and this is aligned in the two-dimensional manner on the chassis 3. Also, the light sources may be aligned, not the two-dimensional manner, but in either the parallel direction or the perpendicular direction, only, i.e., a one-dimensional alignment.

The lights emitting from the light emission surface 13 of the light guidance plate 2 are diffused or scattered by means of an optical member such as, a diffuser sheet 5, for example, which is disposed between the reserve surface of the liquid crystal panel 8 and the light guidance plate 2, to be uniformed or equalized, and are irradiated upon the liquid crystal panel 8.

In the present embodiment, as is illustrated, a certain set (i.e., the light source block) and other (neighboring) light source block are so disposed that the light source 1(*b*) and the incident portion 10 of the latter are located on the bottom surface (i.e., the reverse surface) of the tip portion 9 of the light guidance plate 2(*a*) of the former. Thus, in the present embodiment, the tip portion 9 of a certain light source block and the light source 1 and the incident portion 10 of the light source black neighboring therewith are put up with each other, in the direction orthogonal to the light emission surface 13 of the light guidance plate 2 (i.e., the vertical direction of the drawing surface). Herein, in the vicinity of the incident portion 10 of the light guidance plate 2 is formed a step or difference 20, on which the tip portion 9 of the neighboring should be mounted. Also, between the light guidance plates 2 is provided a gap or groove 4 (hereinafter, being called only "groove").

The light source 1 mentioned above is installed on a bent board 6, being made from a printed circuit board of, such as, AGSP (Advanced Grade Solid-Bump Process) or aluminum, or glass epoxy or PCB (Polychlorinated Biphenyl) or a cupper material, etc., for example, and as a point light source is applied an LED. However, other than the LED, a semiconductor laser, such as, a laser diode, etc., may be applied, for example, or other than the point light source may be applied a fluorescent tube, such as, CCEF (Cold Cathode Fluorescent Lamp) or EEFL (External Electrode Fluorescent Lamp), etc., for example. Alternately, there may be utilized a light source unit of aligning a plural number of point light sources, like a line-like light source.

Also, as the LED may be applied a top-view type, emitting the lights into the perpendicular direction to an electrode surface thereof (i.e., emitting the lights into the vertical direction of a package), or a side-view type, emitting the lights in the parallel direction to the electrode surface (i.e., emitting the lights in the horizontal direction of the package). When applying the top-view type, a surface crossing the surface of the chassis 3 may be formed, by bending a substrate or board in parallel with the surface of the chassis 3, so as to mount the LED of that top-view type on that surface. Also, when applying the side-vide type, the LED may be mounted on the substrate or board in parallel with the surface of the chassis 3, which is mounted on an upper surface of the chassis 3. Further, the light source 1 may be applied a one emitting a plural number of color lights, such as, R, G an B, etc., i.e., enabling to obtain a white color right, by combining or mixing them. In such case, not illustrated in the figure, an optical element or part may be provided for combining or mixing the color lights emitting from each light source. Or, alternately, there may be used the light sources of the same color. Further, also, not illustrated in the figure, but the respective one of the light sources or the plural number of light sources may be controlled as one unit thereof.

The light guidance plate 2 is made of a transparent material, such as, acryloyl, PMMA (Polymethylmethacrylate), ZEONOR®, BMC (Bulk Molding Compound), OZ, polycarbonate, silicon, glass, etc., for example. Further, on the surface facing to the reflector member 7 mentioned above, of the light guidance plate 2, for example, there may be treated an optical unevenness for adjusting permeability, reflectively, light distribution of lights, or a spatial patterning for controlling the transmission factor and/or the reflection factor. Those unevenness and patterning can be manufactured with dot printings, fine patterns or lenses, by means of a metal mold. Further, the light guidance plate 2 may be combined with various kinds of optical elements, such as, a diffuser/reflector sheet, a mirror, a prism sheet, a diffuser plate, a polarizing selective reflection film, etc., or the optical characteristics mentioned above may be achieved through an evaporation, or printing, etc., for example. Not illustrated in the figure, but for the purpose of positioning between the light guidance plate 2 and the chassis 3, a nib, a hole or a gutter may be provided on the light guidance plate 2 or the chassis 3, for use of positioning or fixing thereof.

The chassis 3 is made of a material, such as, aluminum, steel, magnesium, titan alloy, etc., and it is formed through pressing, die casting, or shaving, etc. Also, it may be made of a resin, such as, acryloyl, PMMA, ZEONOR®, BMC, OZ, polycarbonate, silicon, etc., for example.

The optical member 5 includes therein, for example, the diffuser plate or diffuser sheet, the sheet attached with prisms or lenses or fine patterns thereon, i.e., those sheets may be provided with an effect of light diffusing or reflective activity, such as, microscopic periodical structures or a lens effect, etc. With this, further equalization of the lights can be achieved.

The reflector member 7 is built up with, for example, a diffuser/reflector sheet, an aluminum reflector sheet, or a laminated-type reflector sheet, etc.

In case where the backlight is built up with one (1) piece of the light guidance plate, it is difficult to obtain the equalization of the brightness or luminance, if large-sizing thereof is advanced. Then, there can be considered a method of building up the backlight unit by combining a plural number of light guidance plates having high equalization ability of brightness. However, since the brightness distribution for each of the plural number of light guidance plates has a tendency that the brightness is high in the vicinity of the light source 1, then a difference of the brightness is generated on a boundary between the plural number of light guidance plates, and therefore it deteriorates the equalization of brightness of the backlight. Also, there is a gap or a groove between the respective light guidance plates, i.e., between the neighboring light guidance plates, therefore, a dark line or a bright line is generated, and this brings out a possibility of deteriorating the equalization, locally in places, upon the entire surface of the backlight.

For dissolving such a problem, according to the present embodiment, as is shown in FIG. 1, the light source 1(a) is disposed on the incident surface of the light guidance plate 2(a), and that light source 1(a) is disposed below the bottom surface of the light guidance plate 2(b) in other light source block neighboring to that. With this structure, the lights directly emitting from the light source 1(b) on the emission surface of the light guidance plate 2(b) are cut off by means of the light guidance plate 2(a). Thus, the light guidance plate 2(a) is piled up the light source 1(b), above the light source 1(b) of the light source block neighboring to that, while having a function of cutting off the lights from that. Further, on the reverse surface side of the light guidance plate 2 is provided the reflector member, as was mentioned above, and therefore, it is possible to increase the light cut-off effect further high.

Herein, in the present embodiment, when assuming that width of the gap defined between the light guidance plates, mutually, is "d", distance between the light incident surface of the liquid crystal panel 8 and the light emission surface 13 of the light guidance plate 2, or distance between the light incident surface of the optical member 5, which is disposed between the liquid crystal panel 8 and the and the light guidance plate 2, is "h", and further when 2.0 mm>d≧0.1 mm, and 10.0 mm>h≧0.4 mm, then the following condition is satisfied:

$$4 \leq h/d \leq 100$$

The condition mentioned above will be called, a condition 1. However, the distance "h" is considered to be that between the light incident surface of the liquid crystal panel 8 and the light emission surface of the light guidance plate 2 if there is not disposed the optical member 5 between the liquid crystal panel 8 and the light guidance plate 2. If the optical member 5 is disposed between the liquid crystal panel 8 and the light guidance plate 2, it is considered to be that distance between the light incident surface of that optical member 5 and the light emission surface 13 of the light guidance plate 2. In this instance, if the optical member 5 is disposed between the liquid crystal panel 8 and the light guidance plate 2, being piled up with by the plural number of pieces thereof, then the distance is considered to be that, being defined between the incident surface of the optical member 5, which is nearest to the light guidance plate 2, and the light emission surface 13 of the light guidance plate 2.

With such the structures, if bringing the length "L" of the light guidance plate 2 (i.e., the distance of the light emission surface 13, in the direction directing from the incident portion of the light guidance plate 2 towards a tip portion thereof, and except for the step portion 20 therefrom) to be small (for example, L=60 mm, and h=3 mm), or if dividing the light emission region or area of the backlight by a relative large number (for example, 64 to 512 divisions), it is possible to align the light guidance plates, preferably, and thereby achieving a thin-type backlight.

Incase of using a plural number of the light guidance plates 2 therein, there is generated a lowering of the brightness in a portion corresponding to the boundary defined between the light guidance plates 2 mutually, however depending on the configuration of the boundary between the light guidance plates 2 (for example, when an end surface of the boundary has an inclination angle, or it is a diffusing surface, etc.), there is a possibility that a bright line is generated at the portion corresponding to the boundary mentioned above, in the picture displayed on the liquid crystal panel 8.

According to the present embodiment, for the purpose of reducing the lowering of brightness or the bright line, which is generated at the portion corresponding to that boundary, the condition 1 mentioned above is derived from. Thus, for the lights regularly emitting from the light guidance plate 2 to irradiate upon the portion corresponding to the boundary, upon basis of the condition 1 mentioned above, a diffusing distance "h" is provided, fully corresponding to the width of the groove, which is provide on the boundary of the light guidance plate 2.

With this, it is possible to reduce the bright lines and/or the dark lines in a portion corresponding to the boarder between the light guidance plates 2 on the display picture, and thereby to equalize the distribution of brightness or luminance upon the display picture of the liquid crystal panel 8. Herein, a value of "h" is less than 10 mm, and it is disadvantageous for thin-sizing of the display apparatus if exceeding this, i.e., it is difficult to achieve the apparatus having the thickness (i.e., depth), being equal or less than 20 mm, for example. Further, there is also brought about a problem that the brightness is lowered down. Therefore, it is preferable to determine "h" to be less than 10 mm. The condition 1 mentioned above is let from experimental data of the diffusion distances and fluctuation or unevenness of luminance, which are obtained through experiments made by the inventors of the present invention.

Regarding this experimental data, explanation will be made by referring to FIG. 8.

Figure 8:
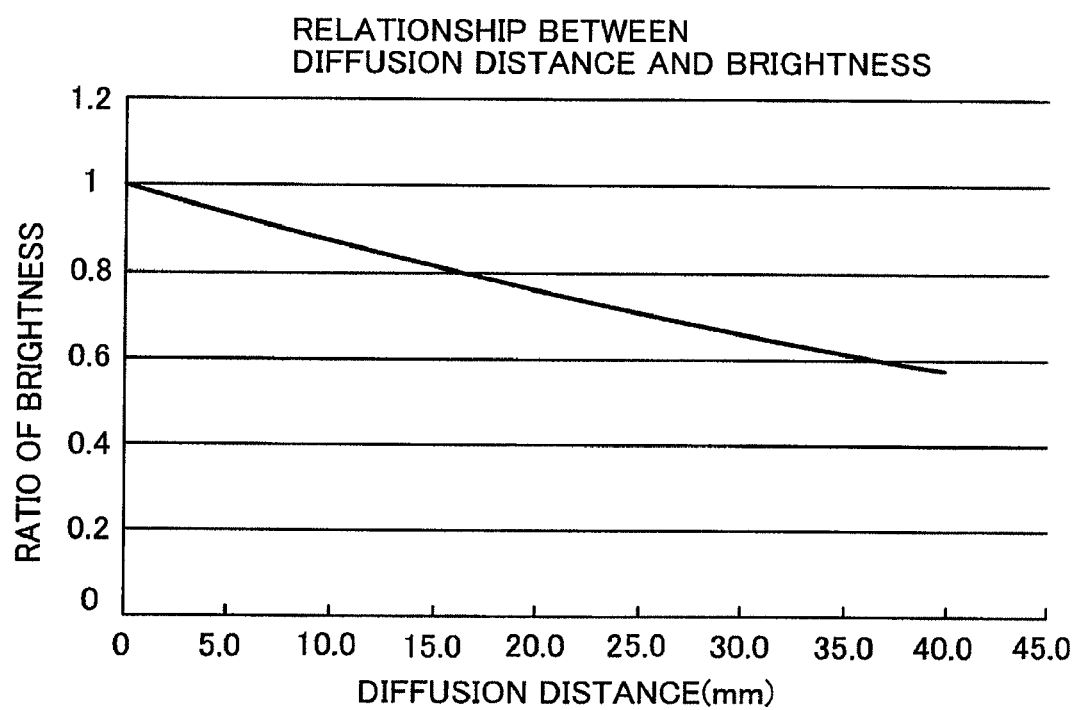
FIG. 8 is a view for showing experimental data relating to the present embodiment, i.e., the relationship between diffusion distance and brightness or luminance.

For example, when irradiating a region of 400 mm, for example, it is apparent that the relationship between the diffusion distance and a ratio of brightness is in accordance with FIG. 8, from the experiments. It can be understood that, from FIG. 8, for obtaining much higher brightness, the diffusion distance must be short. For example, the brightness when the diffusion distance is 0 mm, comes down to be 90% comparing to that when the diffusion distance is 10 mm. Accordingly, in order to obtain practical brightness as the backlight, and further to bring the unevenness of brightness to be invisible or unrecognizable by eyes, it is necessary to build up the backlight as below. Thus, a gap or groove is defined, mutually, between the light guidance plates 2 in each of the plural number of sets thereof, and when assuming that the width of that gap or groove is "d", the distance between an incident surface of the liquid crystal panel mentioned above and a light emission surface of that light guiding plate, or the distance a light incident surface of the optical member, which is disposed between that liquid crystal panel and that light guiding plate, and the light emission surface of that light guiding plate is "h", and further, when 2.0 mm≧d≧0.1 mm, 10.0 mm≧h≧0.4 mm, then the following condition is satisfied:

$$4 \geq h/d \geq 100$$

In this manner, according to the present embodiment, with such disposition of the light source blocks of satisfying the condition 1, equalization can be achieved on the distribution of luminance of the display picture on the liquid crystal panel 8, and as a result thereof, it is possible to provide a backlight unit for reducing the unevenness on the distribution of luminance, which is generated due to the gap between the light guidance plates, i.e., the cause of reason of the unevenness of luminance of the backlight unit.

Further, by means of a reflector member 7 provided on a rear surface of the light guidance plate 2, an increase of luminance can be suppressed in the vicinity of the tip portion 9 of the light guidance plate 2, which is poled on the light source 1. At the same time of this, as was mentioned above, since the diffusion distance "h" can be maintained sufficiently, so as to satisfy the condition 1, the unevenness of the dark lines and/or the unevenness of luminance, which are generated due to the gap between the light guidance plates 2, are reduced, and also the difference of luminance on the boundary between the light guidance plates 2 can be suppressed; therefore it is possible to provide a large-sized or scaled backlight unit having high equality or uniformity of luminance.

Further, since the light sources 1 are disposed on the entire surface of the backlight unit, then density of heat generation from the light sources 1 comes to be small, and then it is possible to provide the backlight unit having a high capacity of heat radiation. And, by combining the backlight mentioned above with the liquid crystal panel 8, it is possible to provide the video display apparatus having high uniformity of luminance.

Figure 2:
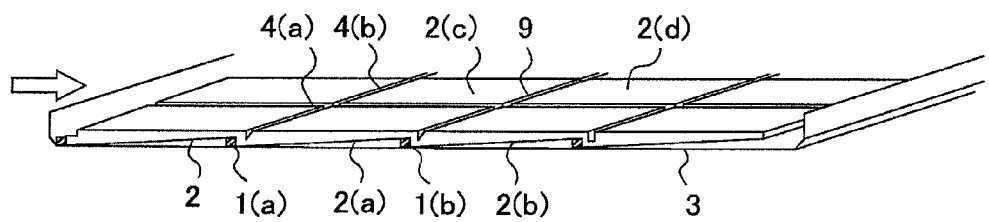
FIG. 2 is a perspective view for showing a variation of the embodiment 1, according to the present invention.
Figure 3:
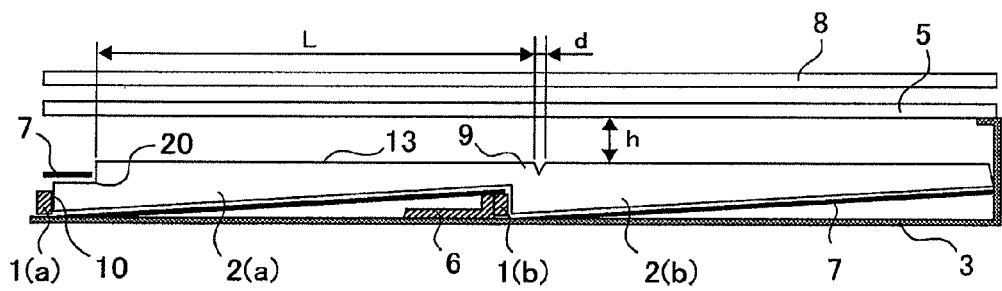
FIG. 3 is a cross-section view in the horizontal direction for showing the variation of the embodiment 1, according to the present invention.
Figure 4:
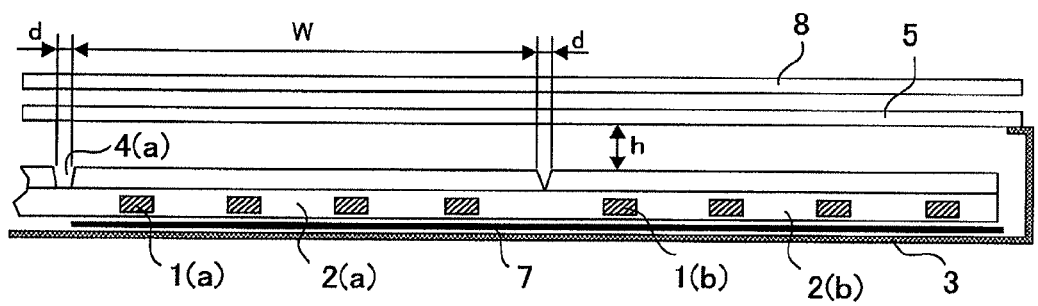
FIG. 4 a cross-section view in the vertical direction for showing the variation of the embodiment 1, according to the present invention.

FIGS. 2 to 4 show a variation of the present embodiment, wherein in particular, FIG. 2 is a perspective view of that variation, FIG. 3 is the cross-section view thereof in the horizontal direction (i.e., the direction directing from the incident portion 10 to the tip portion 9), and FIG. 4 is the cross-section view thereof in the vertical direction (i.e., the direction of aligning the light sources 1), respectively. The light guidance plates 2 are disposed on the backlight unit, in the two-dimensional manner, and plural numbers of light guidance plates are connected with. If paying attention upon the light guidance plate 2(a), 2(b), 2(c) and 2(d), in FIG. 2, every light guidance plate 2 is connected with as a unit or in one body, and on each boundary of each light guidance plate are provided a groove 4(a) for dividing the light guidance plates in the vertical direction and a groove 4(b) for dividing the light guidance plates in the horizontal direction. With those grooves 4(a) and 4(b), it is possible to divide the light distribution of each light guidance plate. For this reason, it is possible to distribute an appropriate amount of lights to each light guidance plate. The cross-section configuration of this groove may "V"-like, trapezoidal, or a straight surface, or in almost "U"-like with providing "R" portion at the tip thereof. Or, by taking an inclination for pulling out it from a mold, in particular, when casting the light guidance plate in the mold, into the consideration thereof, on wall surfaces of the groove are attached pull-out inclinations, each being equal or greater than 2 degree on one. The surface of the groove is a flat surface (a mirror surface finish) through the die casting, so as to generate total reflection thereon.

Depth of the groove 4(a) for dividing the light guidance plates in the vertical direction is so determined in the structure thereof, that it comes to be shallow as it reaches from the incident portion 10 to the tip portion 9, since the light guidance plate 2 is thinned in the thickness thereof in accordance with the direction of extension of that groove 4(a). For this reason, width of the groove is also small at the tip portion 9. Since the condition 1 mentioned above is prepared for obtaining the diffusion distance "h" from a reprehensive width "d" of the groove, then sufficient diffusion distance "h" can be obtained if calculating out the maximum value of that width of the groove in advance. For this reason, in the portions narrower in the width of the groove than the representative width of the groove "d", the lights can be diffused, fully, and therefore do not bring about the unevenness of luminance.

And, by controlling the respective brightness of the light guidance plates, separately, which are connected and disposed in one-dimensional manner or the two-dimensional manner, it is possible to control the brightness on the backlight, locally. As a result thereof, by controlling the intensity of lights from the light source blocks in conformity with the video signal, it is possible to improve the contrast thereof.

In the variation mentioned above, connection of the light guidance plates may be made along only one (1) line in the vertical direction, or may be along only one (1) line in the horizontal direction. Further, as was shown in FIG. 2, they may be connected in the two-dimensional manner, i.e., in the horizontal direction and the vertical direction. Between the light guidance plates connected are provided the grooves 4(a) and 4(b), and the configuration of such groove may be "V"-like, trapezoidal, or "U"-like with providing curvature "R" at the tip of a valley portion. This groove generates the dark portion and/or the bright line at the portion of the display picture on the liquid crystal panel 8, corresponding to that groove, and is a cause of reason of generating the unevenness of luminance, as a peculiar line of light distribution. However, in the similar manner to the example mentioned above, with provision of the diffusion distance "h" so as to satisfy the condition 1 mentioned above, the lights from the light emission surface 13 reach to the optical members 5, including the diffuser plate, etc., after being diffused, fully, in accordance with this diffusion distance "h", therefore it is possible to obtain a uniform distribution of luminance (or may be defined as the distribution of lights or the distribution of brightness).

On the other hand, since the light guidance plates according to the present variation are constructed as a unit or in one body, i.e., being connected with each other, a part of the lights is incident upon a neighboring light guidance plate from a side surface across the boundary of the light guidance plate; i.e., lights are mixed. A volume of leakage of the lights from the light source to the neighboring light guidance plate, being generated herein, can be controlled depending on the depth and the configuration of the groove 4, which is defined between the light guidance plates. For example, directing from the incident portion 10 to the tip portion 9, if determining the depth of the groove to be always a half (½) of the thickness, then the leakage light comes to be about 10% to 50%. Of course, the leakage light changes depending upon the number of the light sources and the width of the light guidance plate. Also, if determining the depth of the groove to be always about ⅓ of the thickness of the light guidance plate, then the volume of leakage lights increases up to 20% to 60%, also if determining at about ¼, the volume of leakage lights comes to 30% to 70%, and if determining at about ⅕, the volume of leakage lights comes to 30% to 80%.

The volume of leakage lights mentioned above is adjusted, appropriately, for obtaining a preferable moving video performance, when conducting an area dimming (or, a local dimming). Herein, the area dimming means to control the intensity of backlight depending on the video signal for each region (or area), and for example thereof, when displaying the picture of a moon rising on the night sky, it is a control of reducing a quantity of lights in the region corresponding to the night sky while increasing the quantity of lights, relatively, in the region corresponding to the moon.

In general, when controlling the quantity of lights for each desired region on the backlight unit, applying a plural number of light guidance plates therein, with using the area dimming or the like, for example, when turning a light source block (i.e., the light guidance plate) to shine, alone, then the light sources neighboring around that light guidance plate are turned OFF. In this instance, it is preferable to control the volume of leakage lights, from the shining light guidance plate to at least 2 to 4 pieces of light guidance plates neighboring thereto upside down and left to right, to be about 20% or greater than that, nearly 50% of each central luminance of those neighboring light guidance plates. With determining the volume of the leakage lights in this manner, it is possible to suppress the step of luminance between the light guidance plates neighboring to each other, i.e., the light guidance plate within the light source block, the light source of which is turned ON and the light guidance plate within the light source block, the light source of which is turned OFF, and thereby to increase the picture quality. For the purpose of obtaining such a volume of the leakage lights, as was mentioned above, it is enough to determine the depth of the groove 4, for example, to be about ½ to ⅓ of the thickness of the light guidance plate 2. It is of course, but when obtaining the volume of leakage lights much more, then it is enough to determine the depth of the groove to be shallower than this (for example, about ¼ to ⅕ of the thickness of light guidance plate 2).

As was mentioned above, according to the present embodiment, it is possible to provide a backlight unit, being advantageous for thin-sizing of the apparatus, bright and high in the uniformity of luminance, and suitable for applying the area dimming therein, as well as, a liquid crystal display apparatus applying the same therein.

<Embodiment 2>

Following to the above, explanation will be given on a second embodiment of the present invention. In this second embodiment, although the structure of the backlight is same to that of the first embodiment, but as the condition to be applied into the light source block is determined further other condition. This condition is as follows.

Thus, it is constructed to satisfy the following condition, if assuming that width of a gap defined mutually between the light guidance plates 2 is "d", a distance between the light incident surface of the liquid crystal panel 8 and the light emission surface 13 of the light guidance plate 2, or a distance between the light incident surface of the optical member 5, which is disposed between the liquid crystal panel 8 and the light guidance plate 2, and the light emission surface of the light guidance plate 2 is "h", a distance of the light emission surface 13 of the light guidance plate 2 in the direction directing from the incident portion of the light guidance plate 2 to the tip portion is "L", and further where 2.0 mm>d≧0.1 mm, and 10.0 mm>h≧0.4 mm:

$$L \times h/d \leq 100$$

The condition mentioned above will be called "a condition 2", hereinafter.

In the present embodiment, with arrangement of the light source blocks of satisfying this condition 2, the lights from the light emission surface 13 of the light guidance plate 2 are diffused fully by the diffusion distance "h", and then it is possible to reduce the dark lines and the bright lines corresponding to the boundaries between the light guidance plates 2, and to reduce the unevenness of luminance on the irradiation surface thereof. Herein, when L=60 mm, d=0.5 mm (this is the case when assuming the gap to be 0.5 mm by taking thermal expansion of a light guidance body, an accuracy of part when being molded, and an error in assembling thereof into the consideration), then L×d/10=3 mm<h, therefore it can be said that the diffusion distance is enough if maintaining "h" to be 3 mm through 4 mm, roughly. Also, in case when making d=1.0 mm, L×d/10=6 mm<h, then "h" must be larger than 6 mm, roughly. The condition 1 mentioned above is guided upon the experimental data of the diffusion distance and the unevenness of luminance, which are obtained through experiments made by the inventors and so on of the present invention.

Thus, it is made clear that the unevenness of luminance can be expressed by L×d/h (in other words, the unevenness of luminance is nearly proportional to L×d/h), with using the distance "L", the width "d" of the gap and the distance "h", from the experiments, which are made by the inventors and so on of the present invention. This means that a drop or falling down of the luminance on the irradiation surface due to the gaps is almost proportional to that width "d", and that if the size "L" of the light guiding plate becomes large, then the bright lines or the dark lines can be seen easily. Accordingly, with constructing the backlight so as to satisfy the condition mentioned above, it is possible to reduce (or bring to be unrecognizable) the unevenness of luminance generated due to the gaps (or the bright lines or the dark lines).

The data regarding the unevenness of luminance can be obtained also through accurate calculation with defining the uniformity of luminance in accordance with fourth power of COS, for example. Herein, the equation changes into a complex equation of sequences having many parameters, depending upon a diffusing function, a light equalizing function and a reflecting function, etc., which are owned by the light guidance plate 2. Accordingly, also an approximation equation from a simple geometrical optics, such as, the condition 2, or the method of defining by an experimental equation may be advantageous from a viewpoint of usability when designing it.

Also, if assuming L=90 mm, the sizes of the light guidance plate becomes large, and the dark line and/or the bright line on the gap between the light guidance plates 2 come (s) to be remarkable, and then for the purpose of reducing this, it is necessary to take the diffusion distance much more. In this instance, if setting d=1.0 mm, because of the condition 2, L×d/10=9 mm<h can be obtained from, i.e., the diffusion distance must be longer.

In case where the unevenness of luminance is a lattice-like, for eyes of a human, it is difficult to detect the unevenness of luminance thereof, when a pitch of that lattice is fine, but when the pitch is wide, then it is easy to detect even the level (the difference of luminance) of the unevenness of luminance being same to that when it is fine, and also width of the unevenness of luminance. Accordingly, when trying to enlarge "L", it is impossible to diffuse the lights fully, if not setting the diffusion distance to be long, and the unevenness of luminance, such as, the dark line and/or the bright line appear(s) remarkably. According to the present embodiment, it is possible to set the diffusion distance "h" depending on the size "L" of the light guidance plate, in accordance with the condition 2, and therefore it is possible to obtain optical performances, being advantageous for thin-sizing of the apparatus and suitable for various sizes of the light guidance plates; i.e., an even or uniform distribution of luminance (or, can be defined as the distribution of lights or also the distribution of brightness).

Of course, the condition 2 defined in this second embodiment can be applied into the variation of the first embodiment shown in FIG. 2.

<Embodiment 3>

Following to the above, explanation will be made on a third embodiment of the present invention, by referring to FIG. 5.

Figure 5:
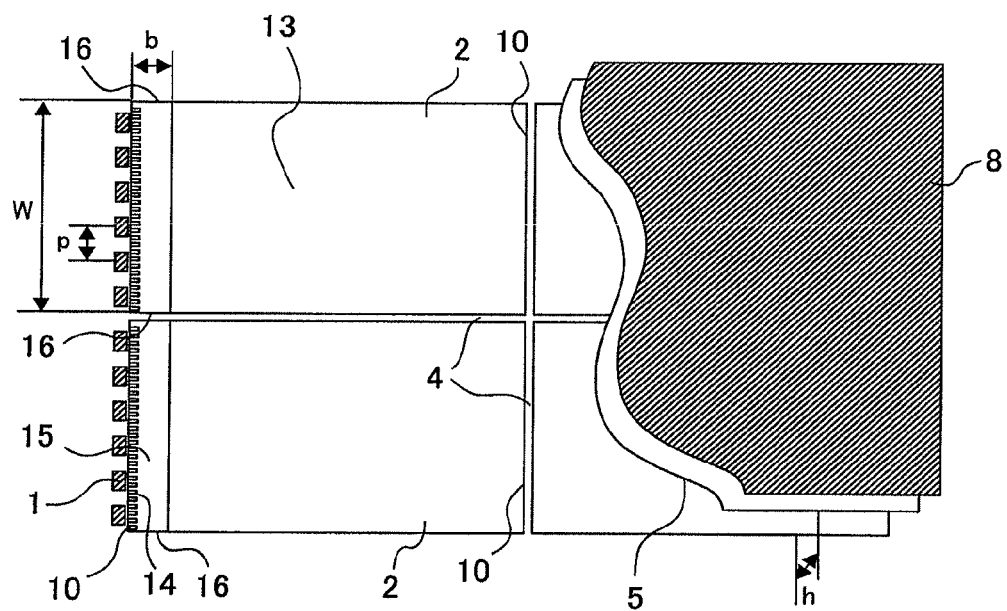
FIG. 5 is a view for showing a backlight unit, according to an embodiment 3 of the present invention.

FIG. 5 is a plane view of watching a plural number of light guidance panels 2, according to the present embodiment, from the side of the liquid crystal panel 8. In the present example, four (4) pieces of light guidance plates 2 are aligned.

In the present embodiment, as is shown in FIG. 5, a diffuser portion 14 is provided on the incident portion 10, upon which the lights from the light source is incident, for diffusing that incident lights, for each of the light guidance plates 2, and also a light guidance diffuser portion 15 is provided in a portion defined between the incident portion 10 and the light emission portion 13.

Herein, when assuming that the distance of the light guidance diffuser portion 15 directing from the incident portion 9 towards the tip portion 10 of the light guidance plate 2 is "b", a number of pieces of the light sources 1 is "N", width of the incident portion 9 of this light guidance plate 2 (i.e., the size of the light source 1 in the direction of alignment) is "W", and the pitch of the light sources 1, which are aligned in the incident portion 9 is "P", then the following condition is satisfied. However, if the light sources 1 are equally disposed in the incident portion 10, then a pitch from the light sources positioned on both ends of the incident portion 9 to an end surface 16 of the light guidance plate 2 is the distance of "P/2", and it is assumed that a pitch of the light sources, which are aligned inside the remaining thereof, is defined as "P".

$$W=P\times N$$

$$P/2/\sqrt{3} \leq b \leq P/2 \times \sqrt{3}$$

The condition mentioned above will be called, the condition 3, hereinafter. With disposing the light sources 1 so as to satisfy this condition 3, it is possible to maintain the light guidance diffusion distance "b", being necessary in relation to the pitch "P" of the light sources.

The light guidance diffusion distance "b", being sufficient for diffusing the lights from the LEDs or the laser light sources, etc., for example, must be long if the pitch of alignment of the light sources is wide. On the other hand, if the pitch of alignment of the light sources is narrow, lights of each of the light sources are mixed fully, even if the light guidance diffusion distance "b" is shorten, the lights from the light sources are outputted on the light emission surface 13.

For example, if assuming that the width "W" of the incident portion 9 is 48 mm, and on this are aligned six (6) pieces of LEDs are aligned as the light sources, with the pitch "P" of about 8 mm, then P/2/√3=2.3 mm, P/2×√3=6.9 mm, then it is possible to maintain the light guidance distance sufficient for mixing the lights of the light sources if maintaining 2.3 mm≦b≦6.9 mm. With this, the difference of luminance, the difference of chromaticity and/or the difference of distribution of lights, etc., of the light sources, due to an individual difference thereof, are mixed up and are averaged, and then it is possible to equalize the lights emitted from the respective light guidance bodies, in aspects of the luminance, the chromaticity and/or the distribution of lights.

Herein, in case where the diffuser portion 14 for diffusing the lights of the light sources on the incident portion 10 of the light guidance plate 2 is has a diffusion angle of 70 degree with respect to the normal line (i.e., a line perpendicular to the surface of the incident portion 9), i.e., when diffusing the principle lights from the light source at an angle of 70 degree, the light guidance distance "b" for use of light mixing is enough to be about 2.3 mm. On the other hand, when diffusing the lights at the diffusing angle of the incident portion 10 of the light source 1, i.e., 45 degree with respect to the normal line, "b"=4 mm, and when diffusing the principle lights at the angle of 30 degree, "b" must be 6.9 mm ("b"=6.9 mm). In this instance, if determining the distance "h", from the light emission surface 13 of the light guidance plate 2 up to the incident surface of the diffuser plate 5 on the side of the liquid crystal panel 8 (i.e., the distance between the irradiation surface of the backlight and the light guidance plate), to be nearly equal to the distance of "b", it is possible to maintain the distance "h" sufficient for diffusing the emitting lights from the light guidance plate 2, and thereby to provide a backlight having an even or uniform distribution.

With such structures of the embodiment 3 as was mentioned above, it is possible to reduce a number of selections for selecting/buying of LEDs, being the light sources, and a stable yield rate of production can be maintained. Thus, a LED or a laser (LD) has fluctuations or unevenness in the optical performances, such as, the unevenness of luminance, and other than that, the unevenness or fluctuations in a color tone, distribution of lights, distribution within a surface, and angle characteristics, etc., for example.

For example, by measuring the optical characteristics and/or distributions, etc., on the side of an optical source maker and separating the optical sources having similar optical characteristics from the entire thereof, it is possible to prepare or arrange the light sources, being uniform in the optical characteristics with suppressing the unevenness thereof which to a certain degree. However, in this instance, the yield rate becomes worth, and also since the unevenness mentioned above is in the normal distribution with respect to a central specification, it is difficult to classify the light sources having the respective optical characteristics at the same ratio. For this reason, when applying the light sources having the performances splitting out from the central specification into one (1) light source unit, there is necessity of putting them in stock until the time when production is made upon a desired number of the light sources having the same performances; then it is unavoidable to keep them in stock for a long time. For this reason, a stock fee is added to a unit cost of the light source, and this brings about the light source and the backlight being expensive.

According to the present embodiment, since the light sources are so disposed that they satisfy the condition 3 mentioned above, even if the light sources have the unevenness or fluctuations in the optical characteristics thereof, it is possible to allow and applied them therein. This is because, with provision of the light guidance diffuser portion 15 having the light guidance distance "b", the lights from the plural number of light sources are diffused and mixed up, in the vicinity of the light incident side of the light guidance plate. With this, while contributing to an increase of the yield rate, it is possible to purchase a large number of LEDs, but without selection thereof, and thereby to reduce the cost of the light sources. However, the number of units of the light sources to be applied and aligned on one (1) piece of light guidance plate is equal or greater that 2 up to 12, but in case where the light source is a high-power (for example, 50 lm to 200 lm/unit), it is also possible to apply one (1) unit of light source on one (1) piece of the light guidance plate. Even in such case, since lights leaking from an end portion of the neighboring light guidance plate generate the mixture of lights, it is possible to reduce the number of selection of the light sources, and thereby to increase the yield rate of the light sources and further to lower the cost thereof. Furthermore, since the mixture of lights is achieved much more, in particular, in the case of such unit-type connected light guidance plates, as was shown in the variation of the embodiment 1, it eases the condition of the specification for the light source, and brings about a hope of low cost.

Also, according to the present embodiment, the structures are so made that the luminance can be obtained through the equalization thereof, with using the LEDs having different optical characteristics. For example, on the chroma or chromaticity coordinates in a CIE color specification system, if the chromaticity of a certain standard LED is (x=0.25, y=0.23), for example, then normally, LEDs are applied within a predetermined error range (for example, x=−0.01, y=−0.01). According to the present invention, with applying the LEDs having characteristics larger than this error range, in a plural number thereof, for example, LED of (x=0.25, y=0.23) and LED of (x=0.25, y=0.27), and through equalization of those, it is possible to obtain the chromaticity of the standard LED (x=0.25, y=0.25). Therefore, with this structure, since it is possible to obtain the desired characteristics even if applying the LEDs having large unevenness or fluctuations of the optical characteristics, there is no necessity of an operation for extracting the LEDs having approximate characteristics therefrom; therefore, reduction can be made on the cost. It is of course that the similar effect can be obtained with the light emitting elements other than the LEDs.

<Embodiment 4>

Following to the above, explanation will be made on an embodiment 4, by referring to FIG. 6 attached.

Figure 6:
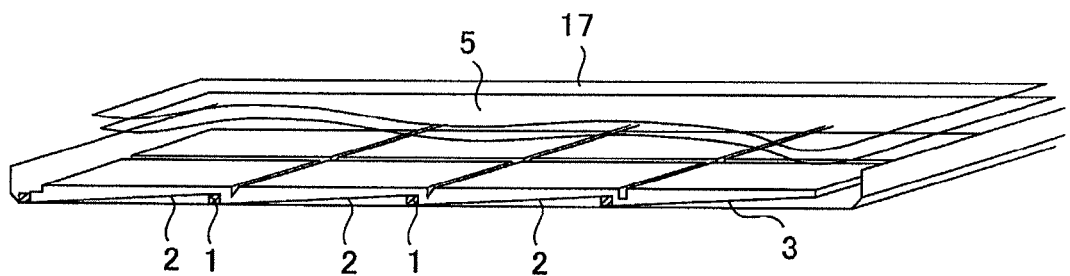
FIG. 6 is a view for showing a backlight unit, according to an embodiment 4 of the present invention.

The present embodiment 4 is characterized in that, within the backlight unit described in those embodiments 1 to 3, at least two (2) kinds of the diffuser plate 5 and the optic sheet 17, each having minute periodical structures, as the optical member, on the light guidance plate 2, at the distance of the diffusion distance "h", as is shown in FIG. 6, for example. With this, according to the mutual or correlation function between the diffuser means and the distance "h", it is possible to reduce the unevenness of light intensity generating on the boundary of the light guidance plate 2, and thereby to provide the backlight having high uniformity. The diffuser plate 5 or the optic sheet 17 having minute periodical structures has a sufficient effect, even if being available on the market, but if it has the structure of a triangle type being fine in the minute period or having a similar cross-section, it is possible to control an angle of the light, and the lights repeat the reflection due to the diffusion effect and the recursive effect of lights, then it is possible to reduce a peak luminance of the dark portion or the bright portion of the unevenness on the boundary.

Also, with the structure of the optical sheet 17 mentioned above, i.e., being mounted on the light guidance plate 1, the diffusion effect and the recursive effect of lights are amplified, and then it is possible to reduce the unevenness of luminance on the boundary between the light guidance plates 2 and also the unevenness of luminance within the surface of each the light guidance plate. Also, the optical sheet 17 may be a luminance-improving sheet, a diffusible sheet, or a combination of those. With doing so, the distribution of orientation of emission lights from the light guidance sheet 2 is changed, so that the unevenness of luminance is improved. As a result thereof, it is possible to provide a backlight unit having high uniformity of luminance.

Figure 7:
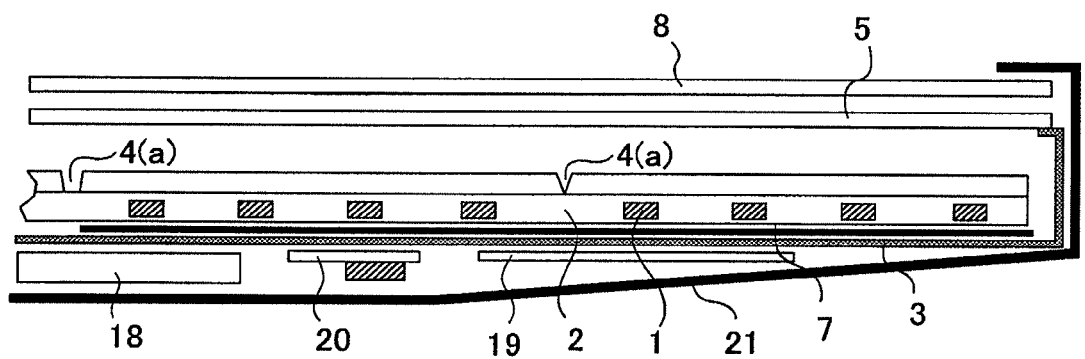
FIG. 7 is a view for showing an example of the structure of a liquid crystal display apparatus installing the backlight unit therein, according to each of the embodiments of the present invention.

Further, by referring to FIG. 7 attached, explanation will be made on an example of the structure of the liquid crystal display apparatus, into which the backlight unit according to the present embodiment is applied. Such liquid crystal display apparatus includes therein the backlight unit, according to the embodiment 1 to the embodiment 4, and is added with the liquid crystal panel 8, thereby constructing a video display apparatus, and FIG. 7 shows the cross-section of a principal portion of that display apparatus.

The liquid crystal display apparatus according to the present embodiment comprises, as is shown in the figure, driver circuits of the light sources and the liquid crystal panels 8, further an electric power source 18 for supplying electric power to various kinds of circuits, such as, the video signal processor circuit 19, etc., for example, the video signal processor circuit 19 for treating various kinds of signal processing, such as, gamma correction and/or contrast correction upon the video signal to be displayed on the liquid crystal panel 8, and further a speed conversion process or a frame-rate conversion process depending on the necessity thereof, a circuit 20 for use of backlight for operating the backlight, a chassis 3, and ornamental parts 21, such as, a front cover and a rear surface cover, etc. With thin-sizing of those parts (for example, equal or less than 8 mm in the thickness thereof), it is possible to provide a liquid crystal display apparatus, such as, a liquid crystal television, a liquid crystal monitor, etc., mounting the thin-sized LED backlight therein. Also, it is possible to reduce the thickness of this display apparatus to be equal or less than from 10 mm to 19 mm, at the most thin portion thereof, while mounting the liquid crystal panel thereon. Thus, the liquid crystal display apparatus according to the present embodiments is the thin-type, and is able to display a high definition picture having high uniformity of luminance.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A liquid crystal display apparatus, comprising:
   a liquid crystal panel; and
   a backlight unit for irradiating lights upon said liquid crystal panel, wherein said backlight unit has plural number of sets, each including at least one or more light sources and a light guidance plate for guiding said lights from said light sources to a side of said liquid crystal panel to be emitted therefrom, and wherein
   said light guidance plate includes an incident portion provided on one end side of said light guidance plate, upon which said lights from said one or more light sources are incident, a light emission surface, from which the lights incident upon said incident portion emit, and a diffusing light guidance portion, which is provided between said incident portion and said light emission surface, and
   when assuming that distance of said diffusing light guidance portion in a light propagating direction is "b", width of said incident portion of said light guidance plate is "W", a number of unit of the light sources corresponding to each of said light guidance plates is "N", and a pitch of the light sources aligned in said incident portion is "P", then the following condition is satisfied:

$W = P \times N$ $P/2\sqrt{3} \leq b \leq P/2 \times \sqrt{3}$.

2. The liquid crystal display apparatus, as described in the claim 1, wherein the light guidance plate in each of said plural number of sets is formed in one body.

3. A backlight unit, comprising:
   plural number of sets, each including one or more light sources and a light guidance plate for guiding lights from said light sources to a side of said liquid crystal panel, wherein
   said light guidance plate includes an incident portion provided on one end side, upon which the lights from said light sources are incident, a light emission surface, from which the lights incident upon said incident portion emit, and a diffusing light guidance portion, which is provided between said incident portion and said light emission surface, and
   when assuming that distance of said diffusing light guidance portion in a light propagating direction is "b", width of said incident portion of said light guidance plate is "W", a number of unit of the light sources corresponding to each of said light guidance plated is "N", and a pitch of the light sources aligned in said incident portion is "P", then the following condition is satisfied:

$W = P \times N$ $P/2\sqrt{3} \leq b \leq P/2 \times \sqrt{3}$.

4. The backlight unit, as described in the claim 3, wherein the light guidance plate in each of said plural number of sets is formed in one body.

* * * * *